Oct. 20, 1964                J. W. BORGER                3,153,558
                PNEUMATIC DISCHARGE HOPPER ARRANGEMENT
Filed Jan. 10, 1962                                  4 Sheets-Sheet 3
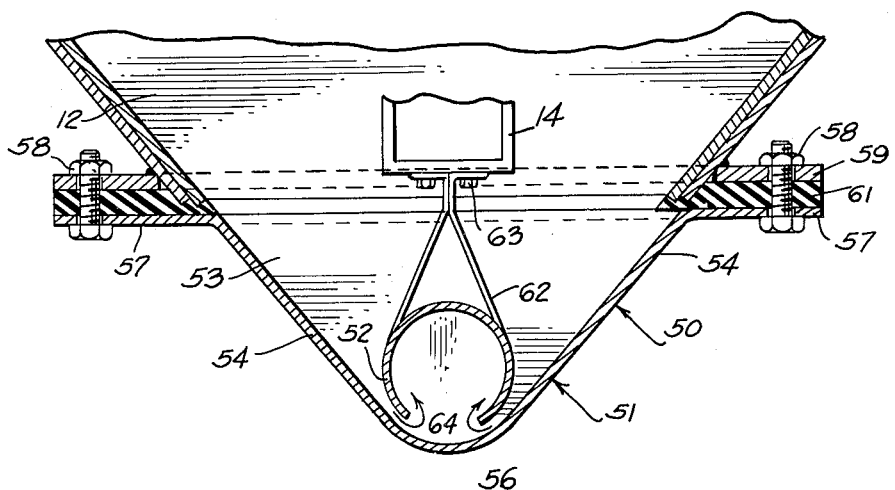
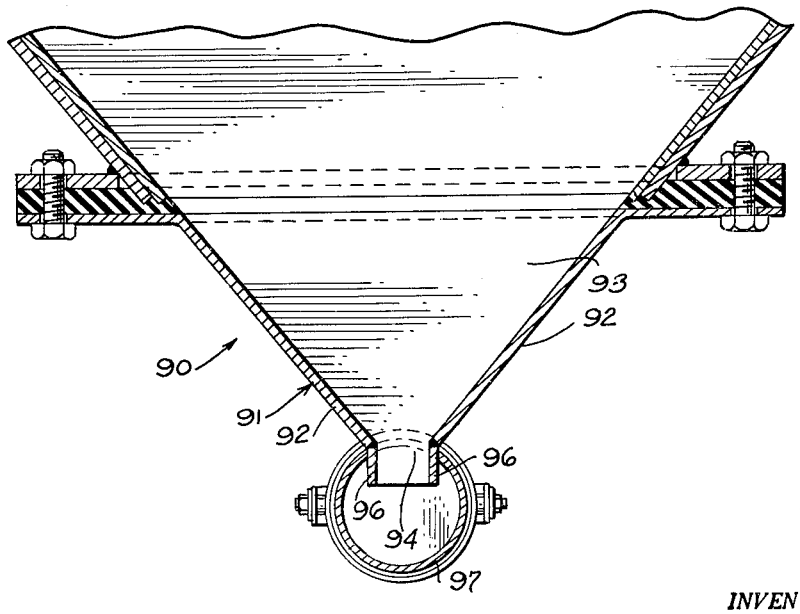
INVENTOR.
JACK W. BORGER Oct. 20, 1964    J. W. BORGER    3,153,558
PNEUMATIC DISCHARGE HOPPER ARRANGEMENT
Filed Jan. 10, 1962    4 Sheets-Sheet 4
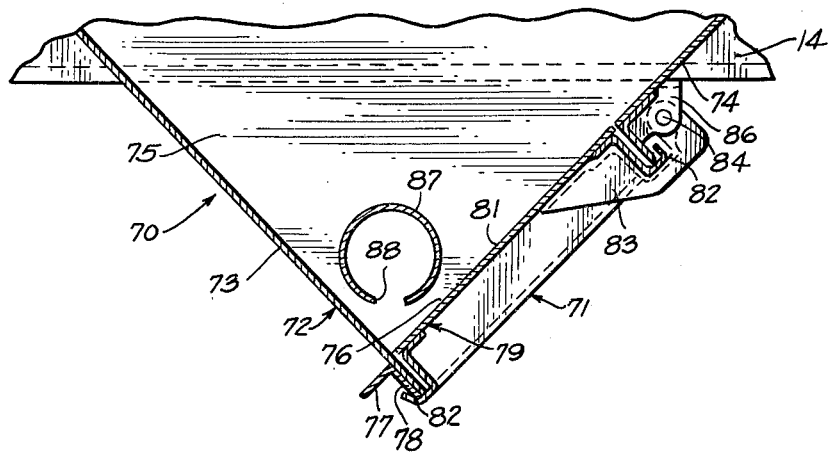
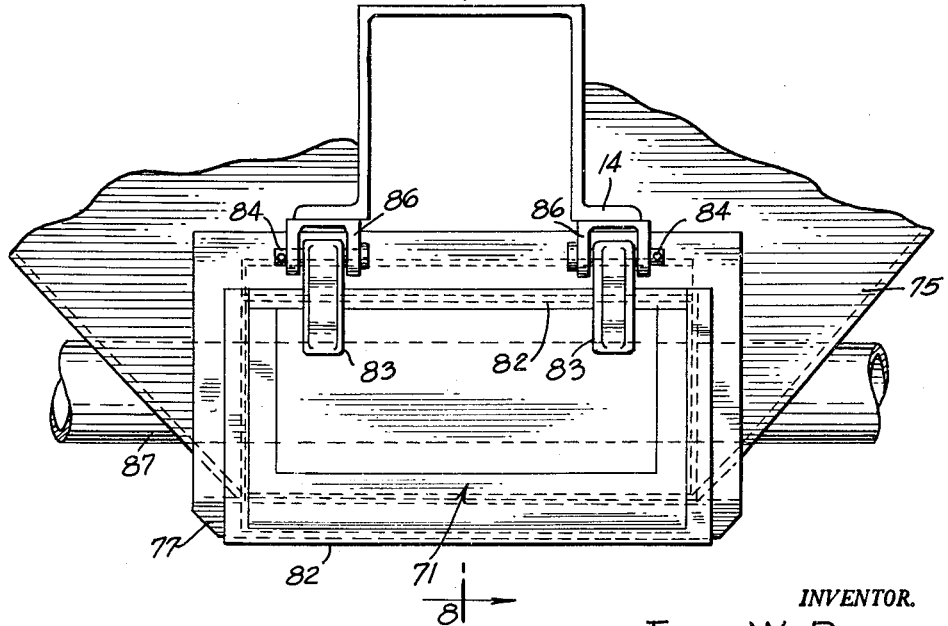
INVENTOR.
JACK W. BORGER
BY Wayne Morris Russell

United States Patent Office 3,153,558
Patented Oct. 20, 1964

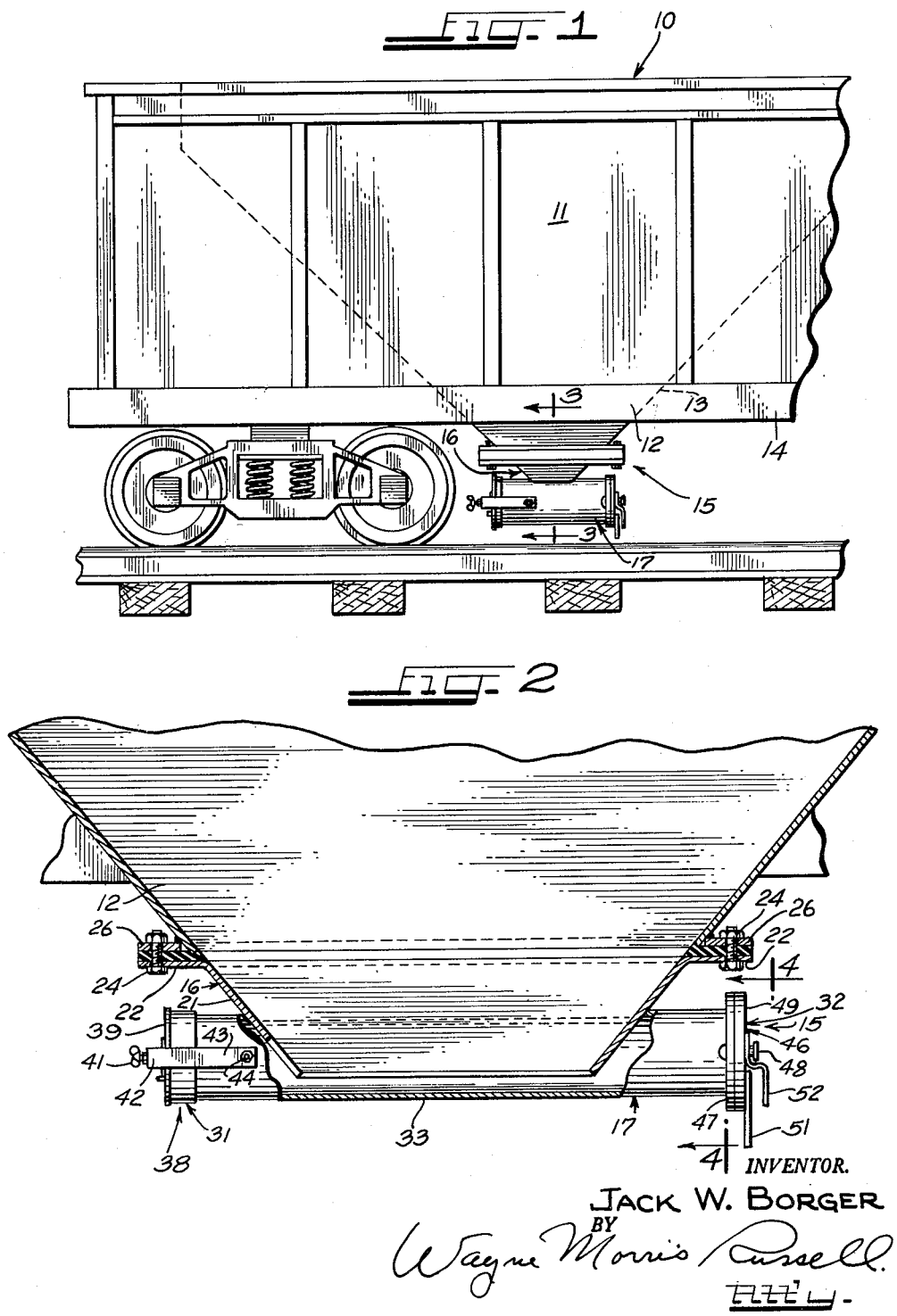

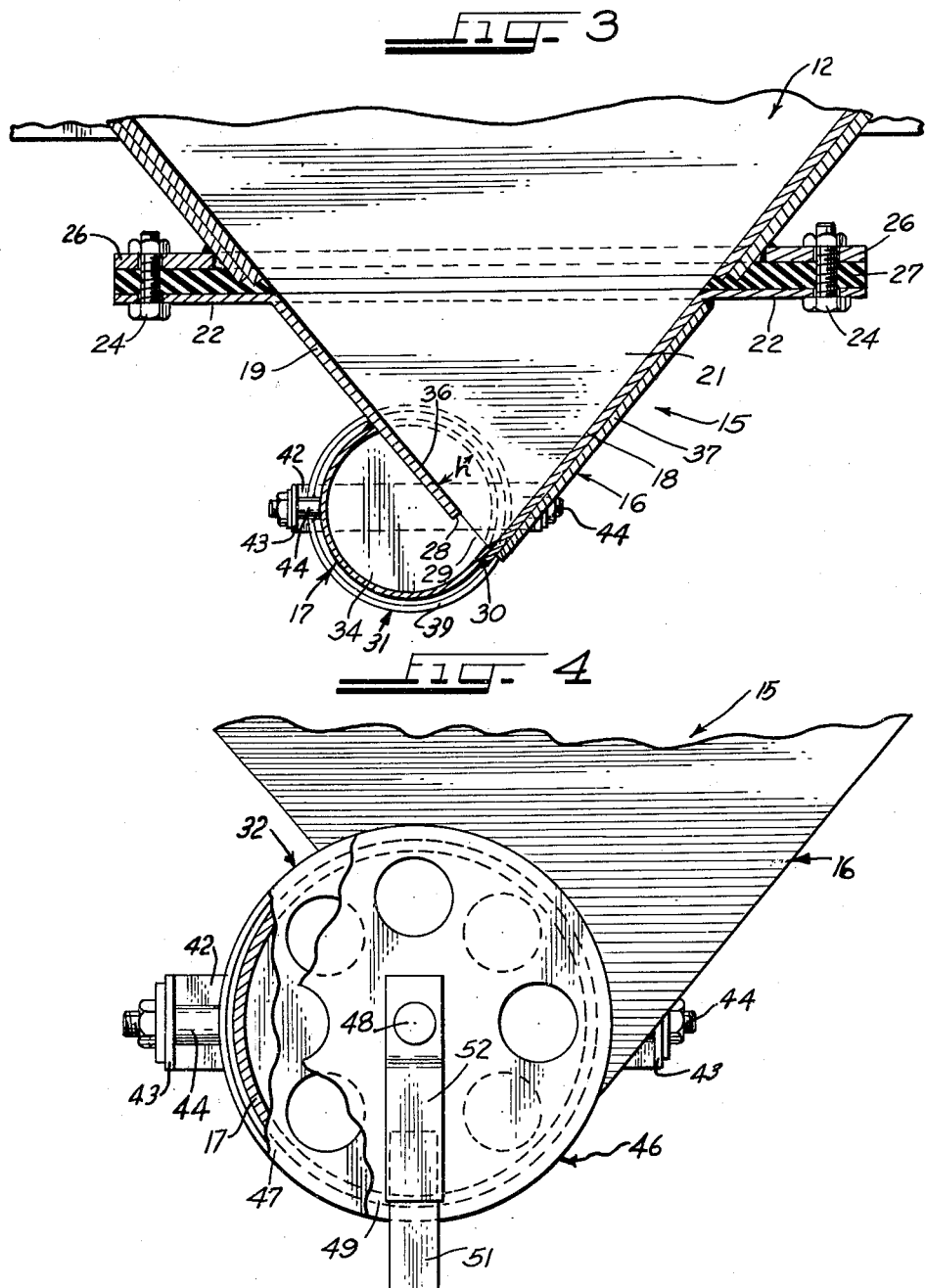

3,153,558
PNEUMATIC DISCHARGE HOPPER
ARRANGEMENT
Jack W. Borger, Calumet City, Ill., assignor to Pullman Incorporated, a corporation of Delaware
Filed Jan. 10, 1962, Ser. No. 165,429
5 Claims. (Cl. 302—52)

The present invention relates to the unloading of hopper type vehicles and, more particularly, to an arrangement for unloading granular or pulverulent material therefrom by way of a pneumatic conveying system.

Pneumatic conveying systems are commonly employed for transporting pulverulent, granular or finely divided material, such as grain, cement, plastics, malt and the like from the hopper-type vehicles to suitable storage receptacles. To accommodate the hopper-type vehicles to such pneumatic conveying systems, the hoppers at their lower discharge end are generally provided with a pneumatic feed structure comprising generally sloping side sheets fastened to the hopper and an outlet connectable to the one end of a flexible suction tube of the pneumatic conveying system.

In the handling of finely divided solids of the type and kind described above, difficulties are oftentimes encountered in maintaining a uniform maximum flow through the pneumatic discharge structure. Of particular difficulty is the problem of the tendency of materials to clog and bridge within the outlet so that the flow of material is restricted to a rate far below the desired maximum or the flow of material may be entirely cut off.

It is a principal object of the present invention to provide a new and improved pneumatic feed structure for attachment to a hopper constructed and arranged so as to maintain a maximum rate of feed therethrough and preclude the clogging and bridging difficulties encountered heretofore.

It is a further object to provide a pneumatic feed structure for attachment to a hopper constructed and arranged to include a material-conveying tube which is provided with material inlet means arranged so that a minimum air space is maintained within the tube to achieve a maximum rate of feed of the material without clogging or bridging.

It is another object to provide a pneumatic feed structure for attachment to a hopper constructed and arranged to include a conveying tube and material inlet means arranged relative to said conveying tube whereby the entry of the granular material is effective to establish a feed pattern within the conveying tube which precludes clogging or bridging of the material and thereby maintains a maximum flow rate.

It is still a further object to provide a pneumatic feed structure for attachment to a hopper including a generally V-shaped housing of which one side of the housing is formed with an opening between the end wall and along the nadir thereof and a tubular member having an end projecting beyond one of the ends of the housing and a cut-away portion disposed between the ends along the nadir and on the side of the housing having the opening so as to provide a trough-like feed receptacle tube for receiving the material falling through the opening.

It is still a further object taken in conjunction with the foregoing object to provide a trough-like feed receptacle wherein the cross-sectional area of the trough-like feed receptacle is greater than one-half the cross-sectional area of the tubular member.

A further object is to provide a new and improved pneumatic feed structure including, as a component thereof, a semi-cylindrical material feed tube extending across the hopper to which the device is adapted to be attached and being arranged to define the bottom wall portion of the device, and further including baffle means providing an air space in the semi-cylindrical feed tube to facilitate the pneumatic discharge of the material.

A still further object is to provide a new and improved pneumatic feed structure incorporating, as a component thereof, means for permitting optional gravity discharge of the material.

Further objects and features will hereinafter appear.

In the drawings:

FIG. 1 is a fragmentary elevational view of a railway hopper car showing at the lower end of the hopper a discharge arrangement embodying one form of the present invention;

FIG. 2 is a fragmentary cross-sectional elevational view of the lower end of the hopper showing the discharge arrangement of the present invention attached thereto with some of the parts of the discharge arrangement being broken away to show underlying details;

FIG. 3 is a fragmentary cross-sectional view of the hopper and the discharge arrangement taken along substantially the lines 3—3 of FIG. 1;

FIG. 4 is a fragmentary end view of the discharge arrangement taken substantially along the lines 4—4 of FIG. 2;

FIG. 5 is a fragmentary transverse cross-sectional view of a second modification of a pneumatic discharge device embodying the principles of the present invention;

FIG. 6 is a fragmentary transverse cross-sectional view of another modification of a pneumatic discharge device;

FIG. 7 is a fragmentary elevational view of still another modification of a discharge device including pneumatic discharge means and gravity discharge means; and FIG. 8 is a fragmentary cross-sectional view taken substantially along the lines 7—7 of FIG. 1.

Referring now to FIGS. 1-4, there is illustrated an end of a more-or-less conventional hopper car 10 having a plurality of longitudinally aligned hoppers 11 of which only one is shown. Each of the hoppers 11 is formed with a bottom discharge portion 12 defined by the converging wall sections 13 and projecting downwardly below the center sill 14 of the car between the wheel trucks 15.

Attached to the bottom of the bottom discharge portion 13 of the hopper 11 is a pneumatic feed device 15 constructed and arranged in accordance with the present invention and which is adapted for attachment to a pneumatic conveying system (not shown).

In accordance with the embodiment illustrated in FIGS. 1-4, the pneumatic feed device 15 comprises generally a housing 16 and a conveying tube 17. The housing 16 is generally substantially V-shaped and includes side walls 18 and 19 and end walls 21 which are arranged to slope in a manner commensurate with a uniform flow of the material through the bottom discharge portion 12 of the hopper 11. The upper edges of the side walls 18 and 19 and the end walls 21 are formed with lateral flanges 22 which receive bolts 24 for fastening the housing 16 to an attaching rim 26 welded to the outside walls 13 of hopper 11. For maintaining an effective seal at the juncture of the hopper 11 and the housing 16, a compressible sealing member 27, formed of rubber or the like, is disposed between the rim 26 and the lateral attaching flange 22.

The side wall 19 is arranged so that its free edge 28 terminates short of the side wall 18 so as to define a material discharge opening 29 extending between the end walls 21 and along one side of the nadir 30 of the housing 16. The free edge 28 is uniformly spaced along its length from the nadir 30 so as to provide a constant longitudinally extending opening 29 through which the material drops under the influence of gravity.

Connected to the side wall 19 is the pneumatic feed tube 17 which as shown includes an outlet end 31 adapted to be connected with the usual flexible suction tube (not shown) of the pneumatic feed system and an air inlet end 32 for adjusting the admittance of air into the tube. The outlet and air inlet ends 31 and 32 each project beyond the end walls 21 of the housing 16. The intermediate portion 33 of tube is cut away and attached along the side wall 16, so that the plane of the inner surface of the latter forms a chord of the bore of the tube. The height h of the chord is less than the inner diameter of the tube so that the area of this circular segment (minor segment) is substantially less than the area (major segment) of the trough-like portion 34 of the tube 17 fixed to the side wall 16. The upper edge of the trough-like portion 34 is fixed on the side wall 19 and the lower edge is fixed to the side wall 18 which is arranged tangential to the outer diameter of the tube 17. With the conveying tube thus affixed, the portion of the side wall 19 intersecting the tube 17 serves as a baffle 36, and the trough-like portion of the pneumatic feed tube receives the material through the elongate nadir opening 29 in the side sheet 19.

It has been discovered that with this arrangement the granular, finely-divided material tends to feed through the tube in a swirling corkscrew like action when the vacuum is applied thereon. This swirling feeding action is in part caused by the relationship of the circular segment area of the trough-like portion and the cross-sectional area of the tube. As heretofore described, the segmental cross-sectional area of the trough-like portion is greater than the circular segment area of the cut-away portion. This relationship of the cut-away and trough-like areas provides a maximum feed volume in the latter up to a level substantially in line with the free edge of the baffle 16. The section of the tube above the level of the granular material provides an air space. However, when the granular material in the trough-like portion of which the longitudinal extent as defined by the end walls 21 is conveyed beyond the end wall adjacent the outlet, the increase in the cross-sectional area as determined by the inner diameter of the tube extending beyond the end wall permits the granular material to enter an enlarged air space defined by the plane of the baffle 36 of the side sheet and which is substantially devoid of a mass of the granular material such that the finely divided granular material is carried therein by the action of the pneumatic conveying system and any tendency of the grain-like material to bridge and clog within the tube is overcome.

Moreover, it is to be noted that the nadir opening 29 is arranged so that the granular material finds a level substantially in line with the free edge 29 of the baffle 30 so that an additional air space is provided in the trough-like portion in the section 33 between the side sheet and the level of the grain, so that the granular material enters the trough-like portion of the tube substantially tangentially along the slope of the side wall 18. The entry of the grain-like material in this manner also contributes to the swirling-feed action.

As shown, the pneumatic conveying tube 17 is fixed to the end and side walls 18, 19 and 21 as by welding and the side wall may be strengthened by an overlying reinforcing plate 37 similarly fixed as by welding.

The feed outlet 31 is normally covered by a removable closure member 38 which, in the form shown, is in the form of a cap 39 which is held in place by a clamp screw 41 carried on a pivotal bracket 42 having leg portions 43 extending inwardly along opposite side portions of the tube 17 and pivotally attached thereto by stub shaft members 44 fixedly attached to the tube 16. The opposite end of the tube 17 projecting outwardly of the housing 16 may be provided with an adjustable vent assembly 46 which includes a fixed apertured plate 47 extending across the open end of the tube 17 and fixedly mounted thereon is an outwardly projecting threaded lock bolt 48. Rotatably mounted on the bolt 48 is an apertured plate 49 having fixed thereon a radially projecting operating lever 51 by means of which the plate 49 may be rotated relative to the plate 47 for selective alignment of apertures to control the amount of air vented into the tube. A lock handle 52 having an internally threaded lock nut portion carried on the lock bolt is located outwardly of the plate 49 and upon rotation about the bolt selectively locks and unlocks the plate 49 in fixed relation with respect to the plate 48.

The adjustable vent assembly 46 is employed to impart the desired feed rate to the granular material. Under some circumstances, such venting of the tube is not necessary because, among other reasons, the venting may be accomplished by other well-known means or the characteristics of the material may be such that the venting is not required. Under these conditions, the adjustable vent assembly 46 may be omitted and replaced with a closure member 38 of the general type shown on the opposite end. It is also to be noted that while the tube 17 is shown extending along the longitudinal axis of the car, it may also be located transversely of the car. With the tube transversely positioned, it may be advantageous to provide both projecting ends with removable closure members so that the suction tube of the pneumatic conveying system may be conveniently attached on the end adjacent the receptacle.

In operating the pneumatic discharge device of FIGS. 1–4, the closure is removed and a suitable suction hose is attached thereto. If necessary, the vent assembly 46 is adjusted for controlled air delivery therethrough and upon the application of suction, material accumulated in the trough-like portion 34 of the tube by way of the nadir slot 29 is removed from the tube through the outlet end by way of the suction applied thereon.

Referring now to FIG. 5, there is shown a section of a pneumatic discharge device 50 including a substantially V-shaped housing 51 and a pneumatic tube means 52 extending through the housing 51. The portion of the tube means which is within the housing 51 is spaced above the bottom wall section of the discharge end portion and spaced from the converging side walls thereof to receive the material.

The pneumatic discharge devic includes the V-shaped housing 51 which is formed by a pair of spaced end walls 53 and a pair of sloping side wall sections 54 bent from preferably a single sheet of metal. The side wall sections 54 are joined by a nadir section 56 of arcuate shape. The end walls 54 are fixed to the side wall sections 56 of the hopper as by welding. The end and side walls 54 and 56 are each provided with lateral attaching flanges 57 which receive bolts 58 for attaching the device 50 to the hopper discharge section 12 by way of the rim 59 welded to the exterior thereof. Disposed between the rim 59 and the lateral flanges 57 is a sealing gasket 61.

The pneumatic discharge tube 52 extends through the housing 51 and projects beyond the end wall structure 53 similarly to the discharge tube shown in FIGS. 1–4. The projecting ends are provided with a closure plate (not shown) at each end thereof, or one of the ends may be provided with a vent control arrangement (not shown) similar to those shown in the embodiment of FIGS. 1–4. The tube 52 is suitably attached to the end walls and located so that the outer diameter thereof is spaced from the side wall sections 54 and the arcuate nadir section 56. To provide additional support, the interior portion of the tube 52 may be supported by straps 62 welded thereto at one end and fixed at their other ends as by bolts 63 to the center sill 14 of the railway vehicle.

The bottom portion of the tube opposing the arcuate nadir is formed with material inlet opening 64 extending between the end walls 53. With the tube 52 thus arranged, material in the hopper 11 is free to flow downwardly under the influence of gravity over the outer periphery of the tube 52 and down the sloping side wall sections 53 about the periphery of the tube and into the arcuate nadir section 56. It is to be noted that the arcuate nadir section 56 is substantially concentric with the tube 52. Some of the material flows into the tube 52 via opening 64 and partially fills the latter. However, because of the location of the opening 64 on the bottom of the tube 52, such that the upper portion of the tube serves as a baffle, the tube is only partially filled by the free flow due to gravity so as to provide an air space within the upper portion of the tube.

In operating the material discharge device 50, the closure member (not shown) is removed from the outlet end and the suction hose is attached thereto. If necessary, the vent assembly (not shown) is adjusted for controlled air delivery. Upon the application of a vacuum or suction, material accumulated in the discharge tube 52 and the arcuate nadir 56 is drawn upwardly in the tube 52 and drawn outwardly through the outlet end and delivered to the usual storage receptacle.

Referring now to FIGS. 7 and 8, there is shown still a further modified form of pneumatic discharge device 70, including as a component thereof, a gravity discharge arrangement 71. The device includes a substantially V-shaped housing 72 having sloping side walls 73 and 74 converging toward a nadir and spaced end walls 75 suitably fixed to the side walls as by welding. The bottom edge of the side wall is spaced from the nadir to provide a gravity discharge opening 76. Bounding the opening 76 and fixed to the side sheets are angle members 77 arranged to provide outwardly projecting legs 78.

Covering the opening 76 is a gate 78 including a plate 81 which in the closed position forms a continuation of the side wall 74. Secured about the periphery of the plate are Z-shaped angle members of which the outer leg is crimped adjacent its free end to form a hook-like rim 82 which in the closed position of the gate receives the projecting legs 78 of the angle members 77. Fixed to the upper edge of the plate 81 is a pair of spaced hinge plates 83 which extend about and over the rim strip 82 and are pivotally attached by hinge pins 84 fixed to clevis-type hinge pins 86 carried advantageously on the underside of the center sill 14 of the railway car.

A cylindrical tube 87 extends through the discharge device housing 72 in spaced relation to the converging side walls 73 and 74 and the nadir of the housing 72. The lower or bottom portion of the tube 87 is provided with a longitudinally extending continuous material-receiving slot 88 through which material is introduced into the tube during pneumatic unloading.

For gravity discharge, the plate 81 is swung downwardly with the edge of the angle brace 83 in engagement with a surface portion of the rim strip 82 providing a pivot point in cooperation with the hinge pins 86 so that gravity discharge occurs through the opening 76. In the closed condition of the plate, the edge of the angle 77 engaging the interior of the rim strip 82 serves as a seal to prevent loss of material therethrough. The plate may be locked in its closed position by any suitable means, such as a conventional car seal (not shown).

During pneumatic unloading of the material wherein the gate 71 is closed, the material flows upwardly into the conduit and longitudinally therethrough when attached to a suction similar to the manner described in connection with the embodiment of FIG. 5. It is to be noted that as in the embodiments previously described, the upper portion of the tube 87 provides for baffling the gravity influenced material in the hopper so that an air space is maintained in the tube at all times.

Turning now to FIG. 6, there is shown a section of a hopper discharge device 90 in which the air space in the conduit is achieved by a baffling arrangement permitting a top entry into a pneumatic feed tube. This embodiment of pneumatic feed arrangement 90 includes a housing 91 having sloping converging side walls 92 and end walls 93. The side walls 92 terminate short of intersecting to form an elongate rectangular slot 94 extending between the end walls 93. Fixed to the lower free ends of the side walls 92 as by welding are vertical downwardly depending flanges 96 which extend the full length of the slot 94. Also fixed to the side walls 92, as by welding, and adjacent the free ends thereof, is a pneumatic feed tube 97 having an upper cut-away portion which receives the downwardly depending flanges 96. With the flanges 96 thus projecting into the feed tube, the normal level of the material introduced therein by way of gravity is substantially in line with the bottom of the flanges 96. In this manner an air space is maintained in the tube above the level of the material between the flanges (which serve as baffle plates) and the segments of the tube extending above the level of the material.

The pneumatic feed tube 97 projects beyond the end walls similarly to the embodiments described heretofore and at least one of the projecting ends may be provided with a closure plate and the other end with a closure plate or air vent assembly. The material is withdrawn from the hopper as heretofore described upon application of a suction to the outlet end.

What is claimed is:

1. An apparatus for conveying granular material from a hopper by way of a pneumatic feed system employing a suction comprising an attachment including a substantially V-shaped housing having end walls and converging side walls, a tubular feed member adjacent the nadir of said housing and extending between the end walls thereof, said tubular member having at least one end projecting beyond one of said end walls to provide an outlet adapted to be connected to the suction means, and opening means formed in said tubular member between said end walls and located so that one of said side walls partially overlies the same to provide baffle means precluding the complete filling of said tubular member and said other of said side walls provides a tangential feed surface through said opening.

2. An apparatus for conveying granular material from a hopper by way of a pneumatic feed system employing a suction comprising a substantially V-shaped housing having end walls and converging side walls which form a nadir, opening means provided along one of said side walls and being defined along one edge by said nadir, a tubular feed member having at one of the ends thereof an outlet adapted to be connected to said suction means, said tubular feed member having a side wall portion cut-away for a length intermediate the ends thereof, said tubular member being fixed to said one side with said length of the remaining side wall portion underlying said opening so that said one converging side forms a baffle within said tubular feed member and thereby to prevent the tubular feed member from being completely filled by the gravity discharge of said granular material through said opening.

3. An apparatus for conveying granular material from a hopper by way of a pneumatic feed system employing a suction comprising a substantially V-shaped housing having end walls and converging side walls which form a nadir, opening means provided along one of said side walls and being defined along one edge by said nadir, a tubular feed member having at one of the ends thereof an outlet adapted to be connected to said suction means, said tubular feed member being of circular cross section and having a length of a segment of said tubular member cut-away intermediate the ends thereof, said tubular member being fixed to said one side with said length of the remaining segment underlying said opening so that said one converging side forms a baffle within said tubular feed member and thereby to prevent the tubular feed member from being completely filled by the gravity discharge of said granular material through said opening.

4. An apparatus for conveying a granular material from a hopper by way of a pneumatic feed system employing a suction comprising a substantially V-shaped housing having end walls and converging side walls which form a nadir, opening means provided along one of said side walls and being defined along one edge by said nadir, a tubular feed member having at one of the ends thereof an outlet adapted to be connected to said suction means, said tubular feed member being of circular cross section and having a length of a minor segment of said circular section cut-away intermediate the ends thereof, said tubular member being fixed to said one side with said length of the remaining major segment overlying said opening so that said one converging side forms a baffle within said tubular feed member and thereby to prevent the tubular feed member from being completely filled by the gravity discharge of said granular material through said opening.

5. An apparatus for conveying granular material from a hopper by way of a pneumatic feed system employing a suction comprising a substantially V-shaped housing having end walls and converging side walls which form a nadir, an elongate rectangular opening formed in one of said side walls and extending between said end walls, said opening being defined along one edge by said nadir, a tubular feed member having at one of the ends thereof an outlet adapted to be connected to said suction means, said tubular feed means being of circular section and having a length of a minor segment of said circular section cut away, said cut-away length being substantially equal to the distance between said end walls, said tubular length being mounted on said housing with the remaining uncut length of the major sector of the circular section fixed along one edge to said nadir and the other edge fixed to said one converging side spaced from said opening so that said one converging side forms a baffle within said tubular feed member and thereby prevents the latter from being completely filled by gravity discharge of said granular material through said opening.

References Cited in the file of this patent

UNITED STATES PATENTS

| | | |
|---|---|---|
| 2,303,810 | Anderson | Dec. 1, 1942 |
| 2,839,338 | Arnold | June 17, 1958 |
| 2,858,165 | Oliver | Oct. 28, 1958 |
| 2,919,158 | Aller | Dec. 29, 1959 |
| 2,950,143 | Koranda | Aug. 23, 1960 |
| 3,048,448 | Aller | Aug. 7, 1962 |
| 3,048,449 | Aller | Aug. 7, 1962 |
| 3,048,450 | Aller | Aug. 7, 1962 |
| 3,050,342 | Koranda | Aug. 21, 1962 |